United States Patent
Bjørkgård

(10) Patent No.: US 7,221,265 B2
(45) Date of Patent: May 22, 2007

(54) SYSTEM FOR SENSING LEVEL CHANGE IN VEHICLES

(75) Inventor: Sven Bjørkgård, Kongsberg (NO)

(73) Assignee: Kongsberg Automotive ASA, Kongsberg (NO)

( * ) Notice: Subject to any disclaimer, the term of this patent is extended or adjusted under 35 U.S.C. 154(b) by 246 days.

(21) Appl. No.: 10/529,141

(22) PCT Filed: Sep. 24, 2003

(86) PCT No.: PCT/NO03/00324
§ 371 (c)(1),
(2), (4) Date: Mar. 24, 2005

(87) PCT Pub. No.: WO2004/028839
PCT Pub. Date: Apr. 8, 2004

(65) Prior Publication Data
US 2005/0271464 A1 Dec. 8, 2005

(30) Foreign Application Priority Data
Sep. 25, 2002 (NO) .................................. 20024604

(51) Int. Cl.
*B60Q 1/00* (2006.01)
*B60G 9/00* (2006.01)
*B60G 17/00* (2006.01)
*B60G 9/04* (2006.01)
*B60G 23/00* (2006.01)
*F16D 1/12* (2006.01)

(52) U.S. Cl. .................... 340/440; 340/438; 280/6.15; 280/124.1; 280/124.11; 280/124.157; 280/124.16; 403/114; 403/122; 701/37; 701/38; 701/70

(58) Field of Classification Search ................ 340/440; 280/124.1, 124.11, 124.157, 124.16; 403/114, 403/122; 701/37–38, 70
See application file for complete search history.

(56) References Cited

U.S. PATENT DOCUMENTS
4,756,374 A 7/1988 Bailey et al.
(Continued)

FOREIGN PATENT DOCUMENTS
DE 101 34 259 A1 2/2003
(Continued)

*Primary Examiner*—Daniel Wu
*Assistant Examiner*—Lam Pham
(74) *Attorney, Agent, or Firm*—Finnegan, Henderson, Farabow, Garrett & Dunner, L.L.P.

(57) ABSTRACT

A system for sensing relative position between chassis (5a, 5b) and axle (3) on a vehicle, which vehicle is provided with a so-called V-rod (1) mounted between the chassis (5a, 5b) and the axle (3) where the pointed end of the V is connected by a ball joint (2) to the axle (3) of the vehicle and the opposite ends (1a, 1b) of the V-rod (1) are connected to the chassis (5a, 5b) of the vehicle, which ball joint (2) comprises a partly ball-shaped body (8) permanently fixed to the axle or the v-rod, encircled by a complementarily shaped collar (9) arranged round the whole or parts of the ball-shaped body (8) which ball joint (2) is covered by a cap or housing. The system is characterised in that on the ball (8) or in connection with the housing in the ball joint there are mounted a sensor (6) and an identification area (7) which is detected by the sensor (6) respectively, which identification area (7) is provided with information for registering position in at least one direction and that the sensor (6) registers the position of the identification area (7) in at least one direction.

11 Claims, 2 Drawing Sheets

U.S. PATENT DOCUMENTS

| | | | |
|---|---|---|---|
| 4,812,806 A * | 3/1989 | Freeman | 340/440 |
| 4,838,563 A | 6/1989 | Konishi et al. | |
| 5,148,106 A | 9/1992 | Ozawa | |
| 5,522,468 A | 6/1996 | Dohrmann et al. | |
| 5,538,264 A * | 7/1996 | Brown et al. | 280/5.514 |
| 5,609,184 A | 3/1997 | Apel et al. | |
| 6,412,790 B2 * | 7/2002 | McKenzie et al. | 280/6.159 |
| 6,637,269 B2 | 10/2003 | Reck et al. | |
| 6,879,240 B2 * | 4/2005 | Kruse | 338/12 |
| 7,066,474 B2 * | 6/2006 | Hiebert et al. | 280/6.153 |
| 2004/0100357 A1 | 5/2004 | Kruse | |

FOREIGN PATENT DOCUMENTS

| | | |
|---|---|---|
| EP | 0 617 260 B1 | 9/1994 |
| EP | 1 199 196 A2 | 4/2002 |
| WO | WO 99/28636 | 6/1999 |

* cited by examiner

SYSTEM FOR SENSING LEVEL CHANGE IN VEHICLES

The present invention relates to a system with a level sensor for use in vehicles with air suspension or hydraulic suspension for identifying the position of an axle in relation to the vehicle's chassis structure.

In vehicles with air suspension a device is required for detecting the position of one or more axles in relation to the vehicle's chassis. When the vehicle is loaded the device will detect this and implement a compensation of the pressure in relevant parts of the air suspension system (preferably one or more air bellows) in order to keep the level and the relative position between the axle and the chassis constant or within desired tolerances. In different embodiments one or more devices may be employed for detecting relative position between axle and chassis, depending on whether it is only level that requires to be compensated or also heeling resulting from unbalanced loading. In this case, if there are several axles, two or more sensors will be able to control different parts of the air suspension system, for example the pressure in different air bellows. If a sensor is mounted on each side of the vehicle, the system will be able to detect and compensate both level in general and heeling to one specific side. If a heeling inhibitor is employed, it will also be possible to use only one sensor provided the opposite side is kept at approximately the same level by means of the heeling inhibitor.

In a system of this kind it is normal practice to employ torsion potentiometers as transmitters/sensors, which are influenced by rods or other mechanical connections and which furthermore communicate with an electronic control system or a valve.

A number of systems are known in the art for relative position detection and level/heel adjustment of this kind. From U.S. Pat. No. 6,412,790 a method for such level identification is known where a rod is installed between axle and chassis, which rod operates a valve in the air suspension circuit when the relative position changes, thus making it desirable to adjust the level. This may be a relative distance which is both too large and too small, depending on the loading on the vehicle. The valve then adjusts the pressure in the air bellows/spring bellows. During this process the sensor and the mechanical arrangement are exposed to fairly severe environmental stresses from stone spatter and water in addition to the risk that loose obstacles on the road or under the vehicle (such as chains, etc.) may damage the components or change the geometry between chassis and axle, resulting in incorrect sensing/adjustment. A further drawback is that two sensors are required for detecting and adjusting heeling. The sensors and the rod arrangement are expensive and installation must be carried out on the vehicle factory's main assembly line to ensure that it is located in the correct position between chassis and axle. The rod arrangement, moreover, has to be correctly aligned on each vehicle in order to adjust the height correctly.

Furthermore, from EP 1 199 196 the use is known of level identification within the actual suspension bellows with, for example, an ultrasound measuring device for distance measurement. The disadvantage of this system is that the sensor is located inside the bellows, which is inconvenient with regard to access during replacement, etc. Moreover, it is necessary to place a sensor in each bellows in order to correct the height level accurately.

The object of the present invention is to provide an improved system for level identification for adjustment, and possibly also for identification of heeling and adjustment in vehicles with air suspension or hydraulic suspension. The system is improved with regard to the disadvantages associated with previously known solutions and can detect heeling and level change with only one sensor.

According to the present invention a new system is provided for identifying level change and heeling based on a so-called V-rod. From Norwegian patent 308963 inter alia, this is known as a connection between an axle and the chassis of a vehicle. The V-rod is arranged located in the longitudinal direction of the vehicle and is mounted in the bottom of the V on the axle. The mounting of the V-rod on the axle is rotatable substantially about two axes (in and across the vehicle's longitudinal direction) and is a ball bearing. Each of the sides of the V is also connected with the chassis. Thus, when the axle moves relative to the chassis, the angle of the V-rod relative to the chassis will change. This applies both to level change and heeling. Thus, at a point where the V-rod is connected to the axle, it will be possible to detect both level change and heeling.

The ball bearing of the V-rod is preferably provided with an external "housing" or cap that surrounds the upper parts of the ball bearing and protects it. This cap can be easily removed for inspection and maintenance. According to the present invention the sensor for identifying level and heeling is mounted inside the housing or under the cap in connection with the actual ball bearing. The sensor is therefore protected against external influences.

According to a preferred embodiment of the present invention, the sensor is also contact-free, there being no mechanical connection between the V-rod and a fixed point on the axle (the ball connection) which provides a representation of the relative position between chassis and axle. This is preferred since calibration and adjustment of the connection are thereby avoided, there are fewer parts that might break down and require inspection and less need for individual adjustment during installation. In additional embodiments, however, it may be possible to use various mechanical connections such as arms or the like between the sensor and a relative sensing point.

According to the present invention, therefore, a system has been provided for sensing the relative position between chassis and axle on the vehicle, which vehicle is provided with a so-called V-rod mounted between the chassis and the axle where the pointed end of the V is connected by a ball joint to the axle of the vehicle and the opposite ends of the V-rod are connected to the chassis of the vehicle, which ball joint comprises a partly ball-shaped body permanently fixed to the axle or the V-rod, encircled by a complementarily shaped collar arranged round the whole or parts of the ball-shaped body, which ball joint is covered by a cap or housing. The invention is characterised in that on the ball or in connection with the housing in the ball joint there are mounted a sensor and an identification area which is detected by the sensor respectively, which identification area is provided with information for registering position in at least one direction and that the sensor registers the position of the identification area in at least one direction. Thus the sensor and the identification area are integrated in the V-rod and can be further connected with the vehicle's control of air suspension or hydraulic suspension for compensation of level and/or heeling.

In an embodiment, therefore, the sensor is mounted in the cap or in another fashion in connection with the ball joint's housing while the identification area is mounted on the ball. In a further embodiment the identification area is mounted in the cap or in another fashion in connection with the ball joint's housing while the sensor is mounted on the ball.

Furthermore, the system is dependent on whether the ball in the ball joint is a part of the axle or the V-rod as long as the sensor is connected with the cap or the housing round the ball bearing and the identification area is provided on the ball. In alternative embodiments the reverse may, of course, also be the case.

In an embodiment the identification area that is detected by the sensor is provided with information for registering different positions in two directions and the sensor registers the position of the identification area in these two directions. The sensor may be of several different types which detect the identification area in the following manner: mechanical identification, distance identification with light, distance identification based on surface state as light reflection, magnetic identification or ultrasound.

The identification area is adapted to the sensor and is provided with information consisting of a number of individual, dissimilar sections with different characteristics such as: reflecting power, material thickness, surface state or mechanical profile. For example, different degrees of surface roughness may be used. Magnetic sensing of an identification area with variable thickness may, for example, also be employed. These are solutions that for the most part are available to a person skilled in the art.

In a further embodiment the identification area that is detected by the sensor is provided with information for registering the position in two directions where the information in one of the directions provides progressive position sensing while the information in the other direction provides sensing of the extreme points and that the sensor progressively registers the position of the identification area in one of the two directions in addition to which the sensor registers extreme points in the second of the two directions. Thus progressive detection of position in one direction can be combined with detection of extreme points in a second direction by detection of high or low value.

Alternatively, the identification area that is detected by the sensor is provided with information for registering position in two directions, where the information in both directions provides progressive sensing so that the sensor progressively registers the different positions of the identification area in one or both of the two directions.

If extreme points are detected on the identification area in one direction, it may result in the sensor not "seeing" the identification area in the other direction, unless the outer limit sensing also permits progressive sensing in the other direction. In this case the identification area and the sensor must be returned to a position where the sensor again "sees" the identification area. This is preferably accomplished by means of a correcting movement as the result of the outer limit signal. This correction may bring the sensor into a situation in the middle of the identification area.

In different embodiments the information in the identification area is composed of a majority of individual sections for progressive detection of the position and a minority of individual sections for registering the extreme points.

The sensor may be connected with the identification area via a mechanical connection. In this case the sensor is usually a torsion potentiometer.

In a further embodiment the signal representing the detected position is transmitted in one or two directions from the sensor to a processing unit. If the time interval between position changes is short (i.e. rapid changes), an alarm signal is activated for play in the ball bearing.

In yet another embodiment the signal representing the detected position is transmitted in the direction representing heeling from the sensor to a processing unit where accumulated heeling in relation to a neutral starting point is registered, and which processing unit activates an alarm signal for dangerous heeling when the accumulated distance representing heeling exceeds a predetermined value.

Various aspects of the invention are further illustrated in the attached figures, in which.

Figure 1:
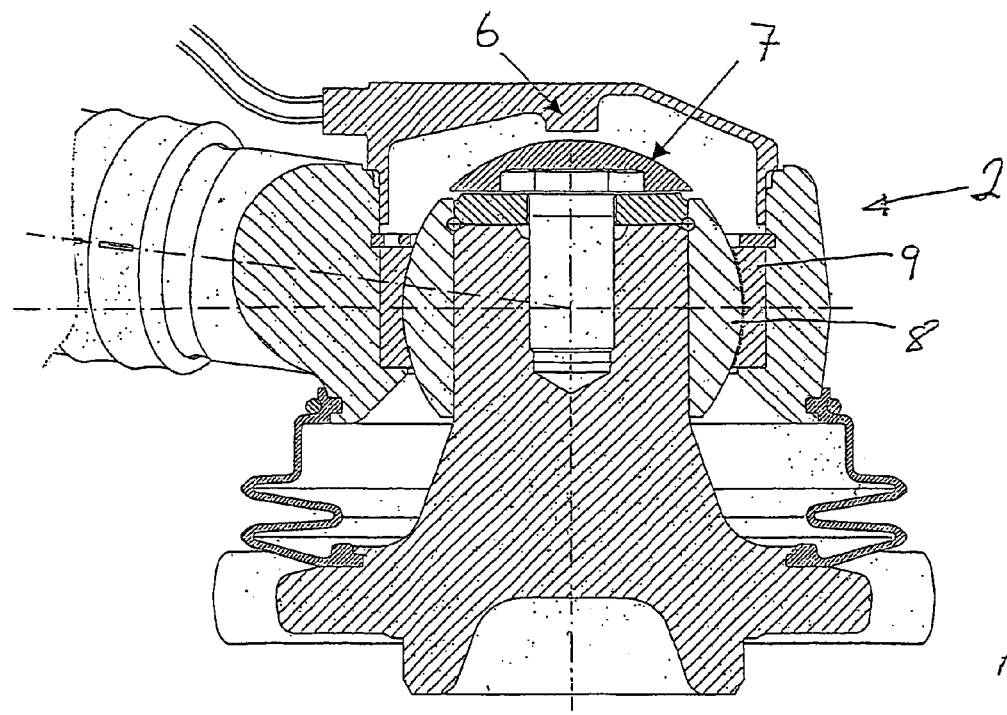
FIG. 1 illustrates the position of a V-rod in a vehicle.

FIG. 1 illustrates a ball joint connection 2 between V-rod and chassis with sensor 6 in the cap over the ball 8. The partly ball-shaped body 8 is encircled by the collar 9 which in turn is connected with the housing (and the cap) in such a manner that the collar 9 moves relative to the ball body 8. Moreover, on the ball joint 2 on the ball 8 there is provided an identification area 7.

Figure 2:
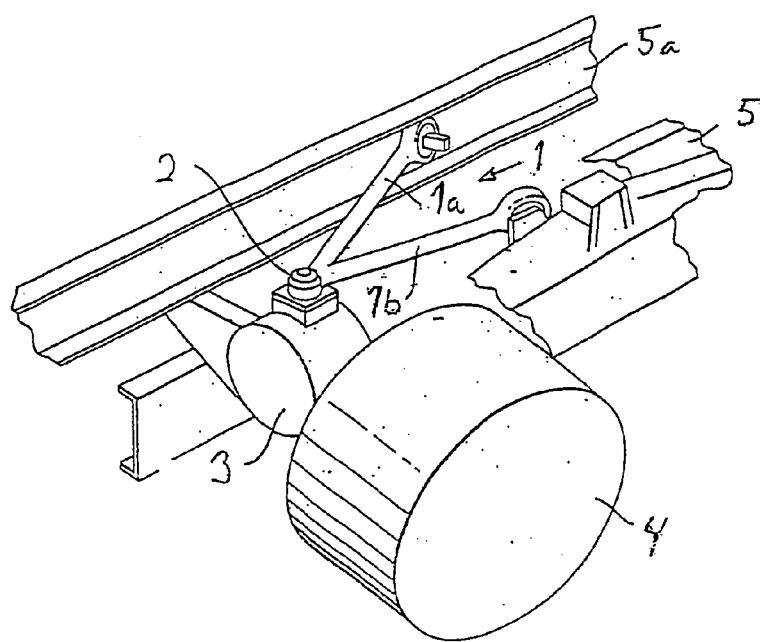
FIG. 2 illustrates a sensor element in the mounting of the V-rod.

Furthermore, in FIG. 2 there is illustrated a general perspective view of an example of a V-rod 1 with rod parts 1a, 1b which are connected with respective parts of the chassis 5a, 5b. The axle 3 with wheel 4 is further connected with the V-rod 1 via the ball joint 2.

Figure 3:
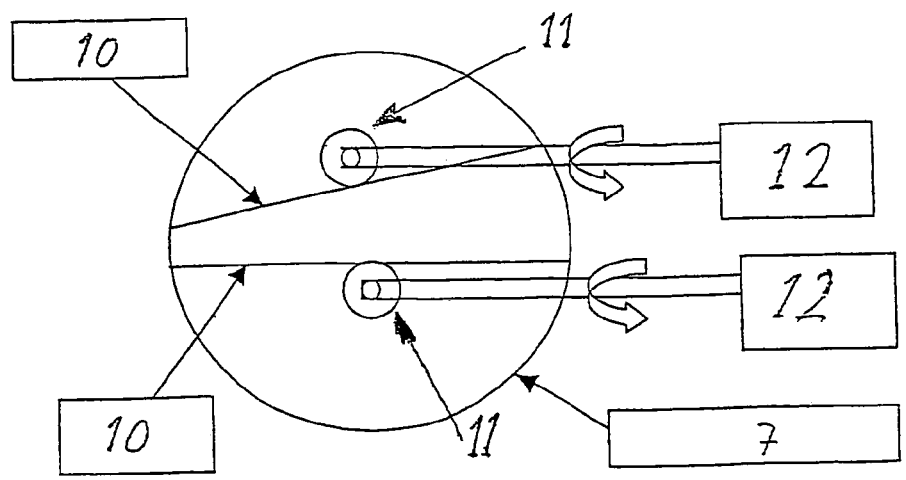
FIG. 3 is a schematic illustration of an embodiment of an identification area and sensor elements.

In FIG. 3, moreover, there is illustrated an example of mechanical connection in an embodiment of the invention viewed from above down into the ball joint. The identification surface 7 is provided with chambers or raised parts 10, which when moved move wheel 11 connected with torsion potentiometers 12 which are sensors in the system.

Figure 4:
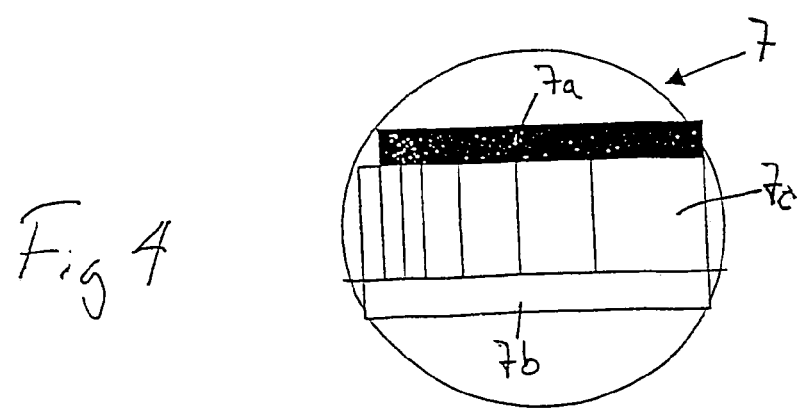
FIG. 4 illustrates an embodiment of an identification area.

A further embodiment is illustrated in FIG. 4 where an identification area is viewed from above (from the sensor). The area 7c provides progressive sensing of position change with several sections with different characteristics while sections 7a and 7b provide only sensing of whether the movement has reached an extreme point.

The invention claimed is:

1. A system for sensing relative position between a chassis and an axle on a vehicle, which vehicle is provided with a V-rod mounted between the chassis and the axle where a pointed end of the V is connected by a ball joint to the axle of the vehicle and opposite ends of the V-rod are connected to the chassis of the vehicle, which ball joint comprises a partly ball-shaped body permanently fixed to the axle or the V-rod, encircled by a complementarily shaped collar arranged round the whole or parts of the ball-shaped body, which ball joint is covered by a cap or housing, wherein on the ball or in connection with the housing in the ball joint there are mounted a sensor and an identification area which is detected by the sensor respectively, which identification area is provided with information for registering position in at least one direction and that the sensor registers the position of the identification area in at least one direction.

2. A system according to claim 1, wherein the identification area which is detected by the sensor is provided with information for registering position in two directions and the sensor registers the position of the identification area in the two directions.

3. A system according to claim 1 or 2, wherein the sensor is of a type that detects the identification area in one of the following ways: mechanical identification, distance identification with light, distance identification based on surface state as light reflection, magnetic identification or ultrasound.

4. A system according to claim 1 or 2, wherein the identification area is provided with information consisting of a number of individual, dissimilar sections with different characteristics such as: reflecting power, material thickness, surface state or mechanical profile.

5. A system according to claim 1 or 2, wherein the identification area which is detected by the sensor is provided with information for registering position in two directions where the information in one of the directions provides progressive sensing while the information in the other direction provides sensing of the extreme points and the sensor progressively registers the position of the identification area in one of the two directions, in addition to which the sensor registers extreme points in the second of the two directions.

6. A system according to claim 1 or 2, wherein the identification area which is detected by a sensor is provided with information for registering the position in two directions where the information in both directions provides progressive sensing so that the sensor(s) progressively registers the position of the identification area in one or both of the two directions.

7. A system according to claim 1 or 2, wherein the information in the identification area is provided with a majority of individual sections for progressive detection of the position and a minority of individual sections for registering position at the extreme points.

8. A system according to claim 3, wherein the sensor is connected to the identification via a mechanical connection.

9. A system according to claim 8, wherein the sensor is a torsion potentiometer.

10. A system according to claim 1, wherein a signal representing the detected position in one or two directions is transmitted from the sensor to a processing unit, which in the event of rapid changes of position activates an alarm signal for play in the ball bearing.

11. A system according to claim 1, wherein a signal representing the detected distance in the direction representing heeling is transmitted from the sensor to a processing unit where accumulated heeling relative to a neutral starting point is registered, and which processing unit activates an alarm signal for dangerous heeling when the accumulated distance representing heeling exceeds a predetermined value.

* * * * *

UNITED STATES PATENT AND TRADEMARK OFFICE
CERTIFICATE OF CORRECTION

PATENT NO. : 7,221,265 B2 Page 1 of 1
APPLICATION NO. : 10/529141
DATED : May 22, 2007
INVENTOR(S) : Sven Bjorkgard It is certified that error appears in the above-identified patent and that said Letters Patent is hereby corrected as shown below:

In claim 4, column 5, line 1, "such as:" should read --including--.

Signed and Sealed this

Fifth Day of August, 2008

JON W. DUDAS
*Director of the United States Patent and Trademark Office*